(12) United States Patent
Kurzweil

(10) Patent No.: US 9,971,398 B2
(45) Date of Patent: May 15, 2018

(54) VIRTUAL ENCOUNTERS

(75) Inventor: Raymond C. Kurzweil, Newton, MA (US)

(73) Assignee: Beyond Imagination Inc., Burbank, CA (US)

( * ) Notice: Subject to any disclaimer, the term of this patent is extended or adjusted under 35 U.S.C. 154(b) by 1297 days.

(21) Appl. No.: 10/734,616

(22) Filed: Dec. 12, 2003

(65) Prior Publication Data

US 2005/0131846 A1   Jun. 16, 2005

(51) Int. Cl.
*G06F 3/00* (2006.01)
*G06F 3/01* (2006.01)

(52) U.S. Cl.
CPC ............... *G06F 3/011* (2013.01); *G06F 3/01* (2013.01); *G06F 3/016* (2013.01)

(58) Field of Classification Search
CPC ............ G06F 3/01; G06F 3/016; G06F 3/011
USPC ...................................... 701/1; 700/245, 258
See application file for complete search history.

(56) References Cited

U.S. PATENT DOCUMENTS

| | | | |
|---|---|---|---|
| 613,809 A | 11/1898 | Tesla | |
| 5,103,404 A * | 4/1992 | McIntosh | 318/568.22 |
| 5,111,290 A | 5/1992 | Gutierrez | |
| 5,184,319 A * | 2/1993 | Kramer | 703/5 |
| 5,354,162 A * | 10/1994 | Burdea et al. | 414/5 |
| 5,659,691 A * | 8/1997 | Durward et al. | 715/757 |
| 5,845,540 A | 12/1998 | Rosheim | |
| 5,889,672 A | 3/1999 | Schuler et al. | |
| 5,980,256 A * | 11/1999 | Carmein | 434/55 |
| 5,984,880 A * | 11/1999 | Lander et al. | 600/595 |
| 6,005,548 A * | 12/1999 | Latypov et al. | 345/156 |
| 6,016,385 A * | 1/2000 | Yee et al. | 700/245 |
| 6,275,213 B1 | 8/2001 | Tremblay et al. | |
| 6,368,268 B1 | 4/2002 | Sandvick et al. | |
| 6,583,808 B2 | 6/2003 | Boulanger et al. | |
| 6,695,770 B1 * | 2/2004 | Choy et al. | 600/38 |
| 6,726,638 B2 * | 4/2004 | Ombrellaro | 600/587 |
| 6,741,911 B2 * | 5/2004 | Simmons | 700/245 |
| 6,771,303 B2 | 8/2004 | Zhang et al. | |
| 6,786,863 B2 * | 9/2004 | Abbasi | 600/38 |
| 6,832,132 B2 | 12/2004 | Ishida et al. | |
| 6,859,819 B1 * | 2/2005 | Rosenberg et al. | 709/203 |
| 6,958,746 B1 | 10/2005 | Anderson et al. | |
| 7,046,151 B2 * | 5/2006 | Dundon | 340/573.1 |
| 7,095,422 B2 | 8/2006 | Shouji | |
| 7,124,186 B2 | 10/2006 | Piccionelli | |
| 7,164,969 B2 | 1/2007 | Wang et al. | |

(Continued)

FOREIGN PATENT DOCUMENTS

WO  WO00/59581  * 10/2000  ............. A63B 23/20

OTHER PUBLICATIONS

Rosenberg, "The Use of Virtual Fixtures as Perceptual Overlays to Enhance Operator Performance in Remote Environments" AL/CF-TR-1994-0089, published in DTIC 1995.*

(Continued)

*Primary Examiner* — Peter D Nolan
(74) *Attorney, Agent, or Firm* — Fish & Richardson P.C.

(57) ABSTRACT

A virtual encounter system includes a humanoid robot having tactile sensors positioned along the exterior of the humanoid robot. The tactile sensors send tactile signals to a communications network. The virtual encounter system also includes a body suit having tactile actuators. The tactile actuators receive the tactile signals from the communications network.

15 Claims, 10 Drawing Sheets

(56) References Cited

U.S. PATENT DOCUMENTS

| | | | |
|---|---|---|---|
| 7,164,970 | B2 | 1/2007 | Wang et al. |
| 7,319,466 | B1* | 1/2008 | Tarr et al. .................... 345/419 |
| 7,333,622 | B2* | 2/2008 | Algazi et al. ................. 381/310 |
| 2002/0049566 | A1 | 4/2002 | Friedrich et al. |
| 2002/0080094 | A1 | 6/2002 | Biocca et al. |
| 2002/0116352 | A1* | 8/2002 | Kilgard et al. ................. 706/25 |
| 2003/0030397 | A1* | 2/2003 | Simmons ................. 318/568.11 |
| 2003/0036678 | A1 | 2/2003 | Abbassi |
| 2003/0093248 | A1 | 5/2003 | Vock et al. |
| 2003/0229419 | A1 | 12/2003 | Ishida et al. |
| 2004/0034302 | A1* | 2/2004 | Abovitz et al. ............... 600/428 |
| 2004/0046777 | A1* | 3/2004 | Tremblay et al. ............ 345/702 |
| 2004/0088077 | A1 | 5/2004 | Jouppi et al. |
| 2004/0104935 | A1 | 6/2004 | Williamson et al. |
| 2005/0027794 | A1* | 2/2005 | Decker ......................... 709/201 |
| 2005/0130108 | A1 | 6/2005 | Kurzweil |
| 2005/0131580 | A1 | 6/2005 | Kurzweil |
| 2005/0131846 | A1 | 6/2005 | Kurzweil |
| 2005/0140776 | A1 | 6/2005 | Kurzweil |
| 2005/0143172 | A1 | 6/2005 | Kurzweil |
| 2008/0059138 | A1* | 3/2008 | Tremblay et al. .............. 703/11 |

OTHER PUBLICATIONS

Rosenberg, "'Virtual fixtures': Perceptual overlays enhance operator performance in telepresence tasks" Stanford University, Stanford, CA, Aug. 1994.*

Hasunuma et al., Development of Teleportation Master System with a Kinesthetic Sensatin of Presence, 1999, Internet, p. 1-7.

Kanchiro et al., Virtual Humanoid Robot Platfrom to Develop Controllers of Real Humianoid Robots without Poiting, 2001, IEEE, p. 1093-1099.

Hou et al., Teleoperation Characteristics and Human Response Factor in Relation of A Robotic Welding System, 1996, IEEE, p. 1195-1202.

Kara et al Real-Time Animation of Realistic Virtual Humans. 198. IEEE, p. 42-56.

* cited by examiner

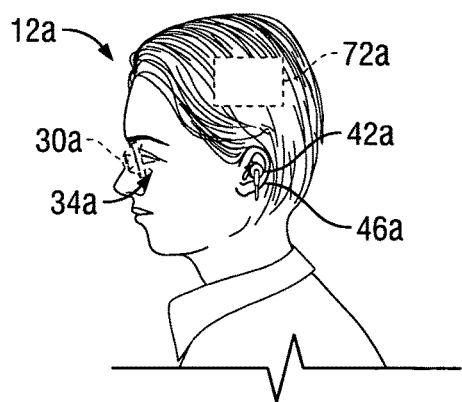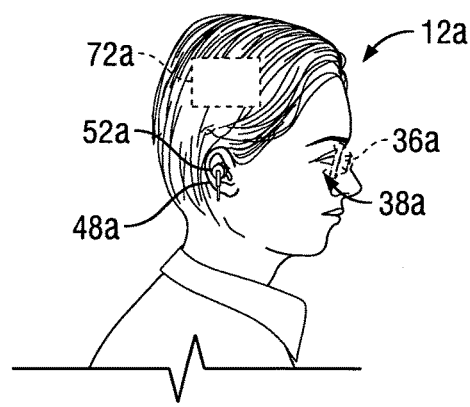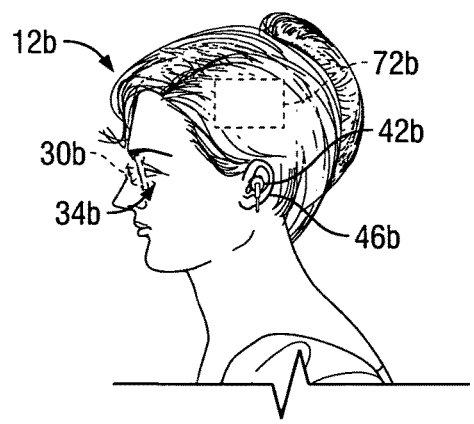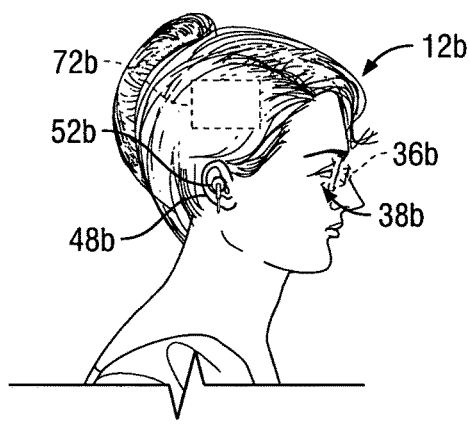
FIG. 2A    FIG. 2B

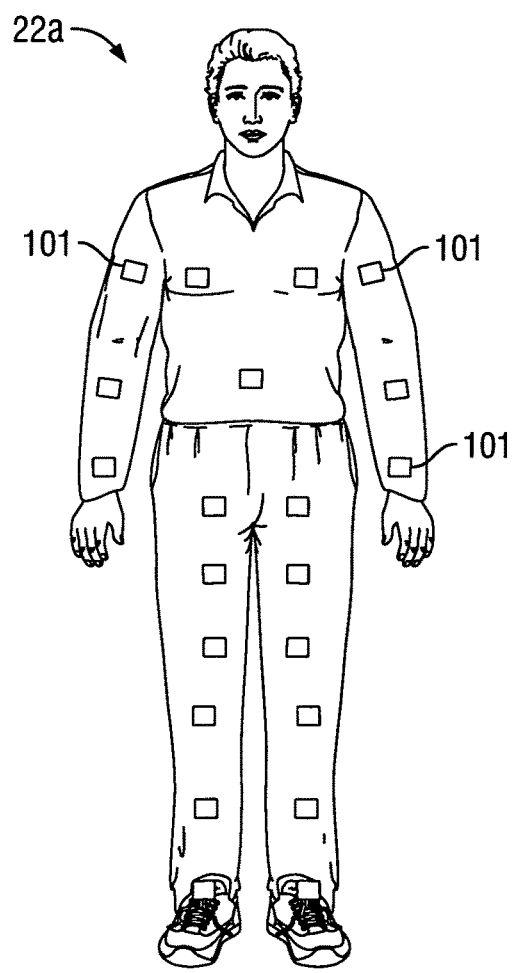
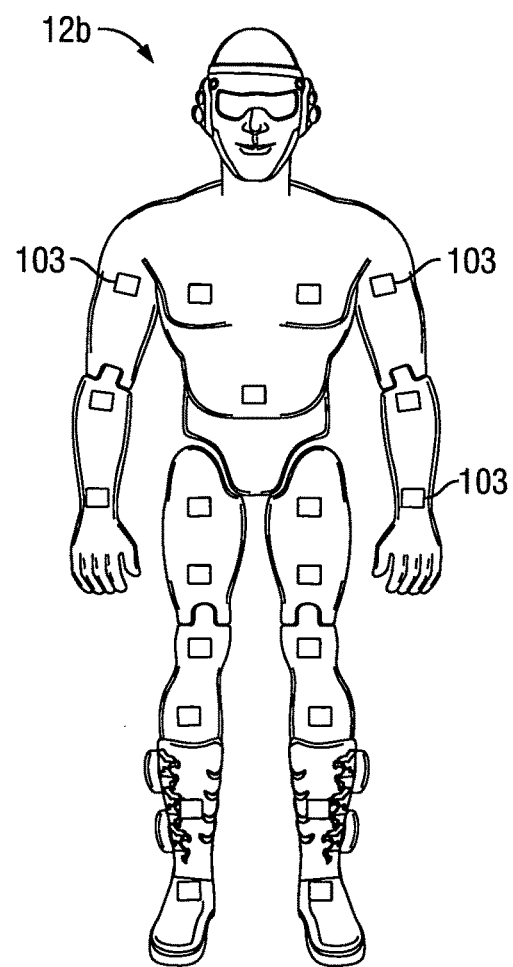
FIG. 7A  FIG. 7B

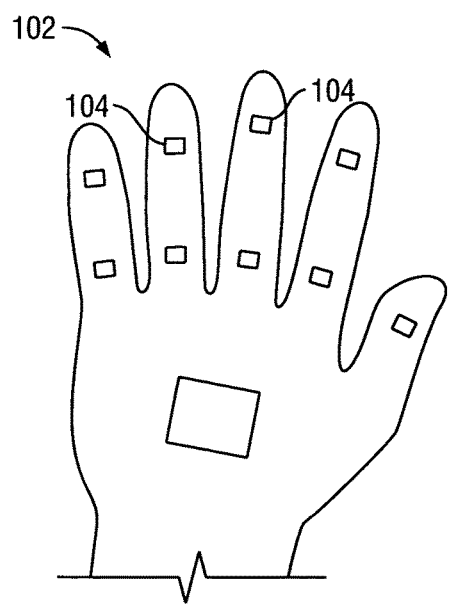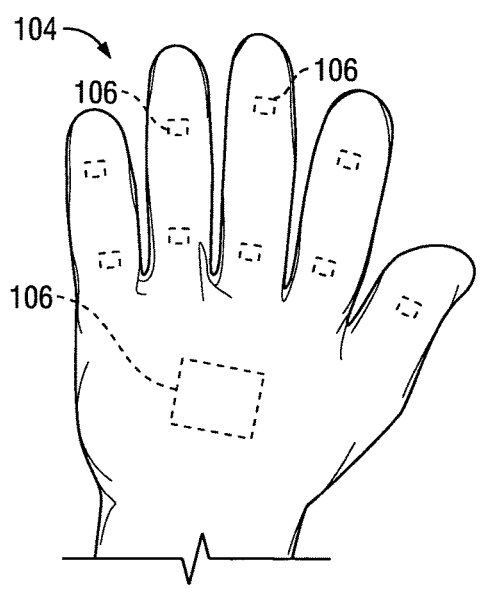
FIG. 8A
FIG. 8B

VIRTUAL ENCOUNTERS

TECHNICAL FIELD

This disclosure relates to virtual reality devices, and in particular, using these devices for communication and contact.

BACKGROUND

Two people can be separated by thousands of miles or across a town. With the development of the telephone, two people can hear each other's voice, and, to each of them, the experience is as if the other person was right next to them. Other developments have increased the perception of physical closeness. For example, teleconferencing and Internet cameras allow two people to see each other as well as hear each other over long distances.

SUMMARY

In one aspect, the invention is a virtual encounter system that includes a humanoid robot having tactile sensors positioned along the exterior of the humanoid robot. The tactile sensors send tactile signals to a communications network. The virtual encounter system also includes a body suit having tactile actuators. The tactile actuators receive the tactile signals from the communications network.

In another aspect, the invention is a method of having a virtual encounter. The method includes sending tactile signals to a communications network from tactile sensors coupled to a humanoid robot. The tactile sensors are positioned along the exterior of the robot. The method also includes receiving the tactile signals from the communications network at a body suit having tactile actuators.

One or more of the aspects above have one or more of the following advantages. The virtual encounter system adds a higher level of perception that two people are in the same place. Aspects of the system allow two people to touch and to feel each other as well as manipulate objects in each other's environment. Thus, a business person can shake a client's hand from across an ocean. Parents on business trips can read to their children at home and put them to bed. People using the system while in two different locations can interact with each other in a virtual environment of their own selection, e.g., a beach or a mountaintop. People can change their physical appearance in the virtual environment so that they seem taller or thinner to the other person or become any entity of their own choosing.

DESCRIPTION OF THE DRAWINGS

FIG. 2A is a view of a left side of a head of a mannequin.
FIG. 2B is a view of a right side of the head of the mannequin.
FIG. 7A is a view of a user with motion sensors.
FIG. 7B is a view of a robot with motion actuators.
FIG. 8A is a view of a left hand of the robot.
FIG. 8B is a view a left glove worn by the user.

DESCRIPTION

Figure 1:
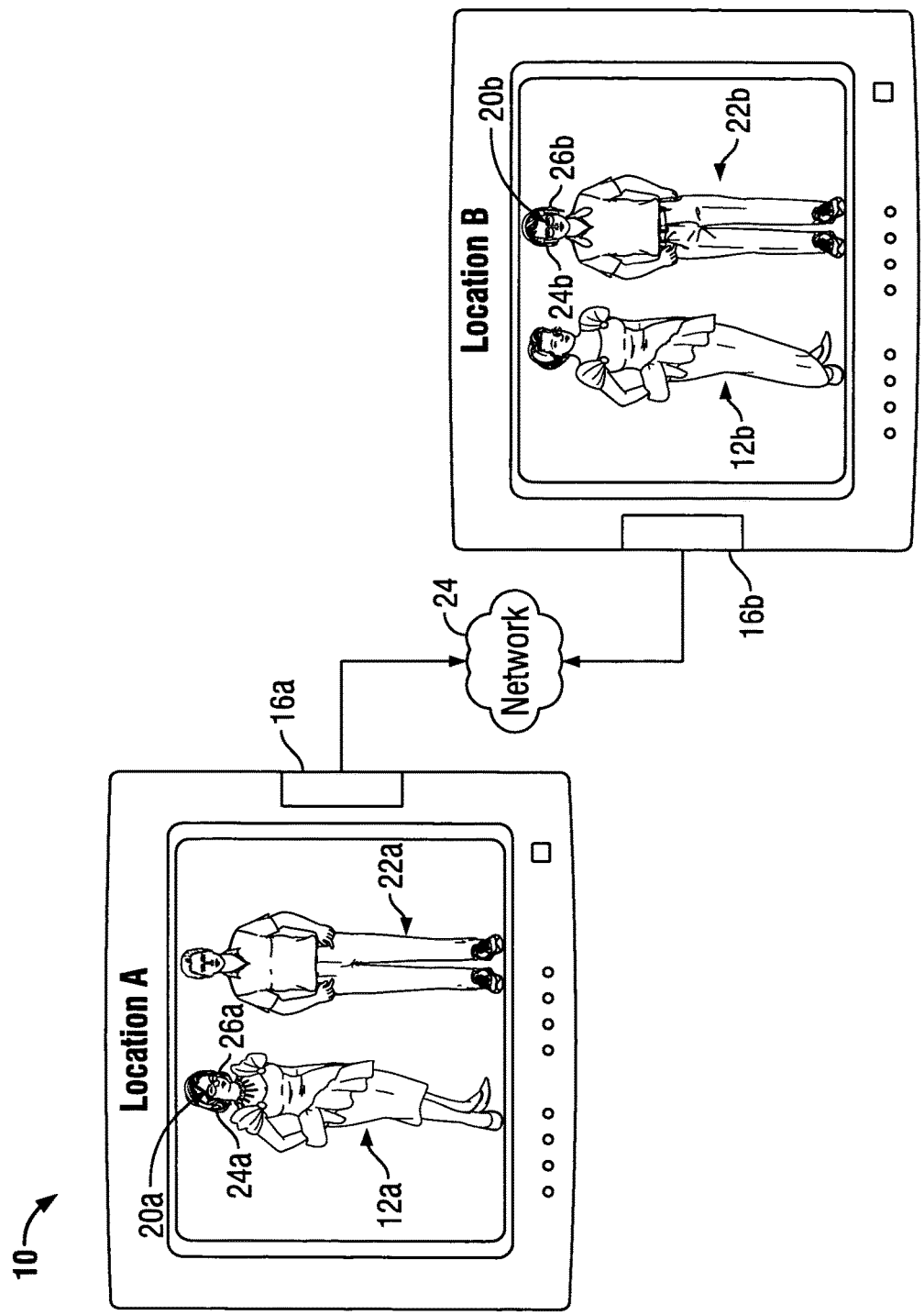
FIG. 1 is a view of a virtual encounter system.

Referring to FIG. 1, a virtual encounter system 10 includes in a first location A, a mannequin 12a, a communication gateway 16a, a set of goggles 20a worn by a user 22a, and two wireless earphones (earphone 24a and earphone 26a) also worn by user 22a. System 10 can further include in a location B, a mannequin 12b, a communication gateway 16b, a set of goggles 20b worn by a user 22b, and two wireless earphones (earphone 24b and earphone 26b) also worn by user 22b. Gateway 16a and gateway 16b are connected by a network 24 (e.g., the Internet).

As will be explained below, when user 22a interacts with mannequin 12a in location A by seeing and hearing the mannequin, user 22a perceives seeing user 22b and hearing user 22b in location B. Likewise, user 22b listens and sees mannequin 12b but perceives listening and seeing user 22a in location A. Details of the gateways 16a and 16b are discussed below. Suffice it to say that the gateways 16a and 16b execute processes to process and transport raw data produced for instance when users 22a and 22b interact with respective mannequins 12a and 12b.

Referring to FIGS. 2A and 2B, each mannequin 12a-12b includes a camera (e.g., camera 30a and camera 30b) positioned in a left eye socket (e.g., left eye socket 34a and left eye socket 34b), and a camera (e.g., camera 36a and camera 36b) positioned in a right eye socket (e.g., right eye socket 38a and right eye socket 38b).

Each mannequin 12a-12b also includes a microphone (e.g., microphone 42a and microphone 42b) positioned within a left ear (e.g., left ear 46a and left ear 46b), and a microphone (e.g., microphone 48a and microphone 48b) positioned within a right ear (e.g., right ear 52a and right ear 52b).

Each mannequin 12a-12b further includes a transmitter (e.g., transmitter 72a and transmitter 72b) containing a battery (not shown). Transmitters 72a-72b send the audio and video signals from the cameras and the microphones to communication gateway 16a-16b.

Figure 3:
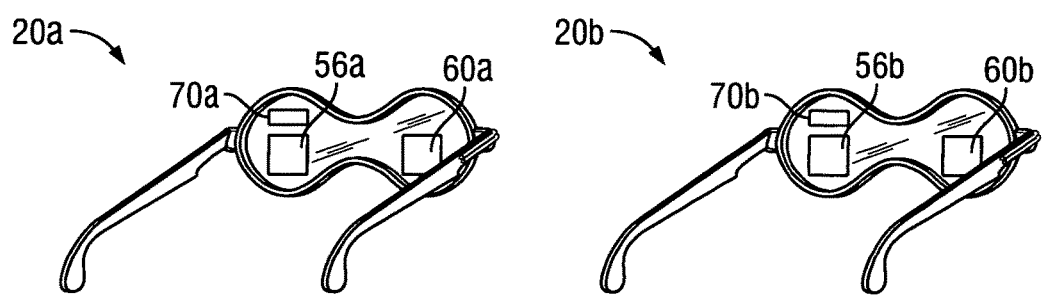
FIG. 3 is a view of a set of virtual glasses.

Referring to FIG. 3, each set of goggles 20a and 20b includes one left display (left display 56a and left display 56b) and one right display (right display 60a and right display 60b). Each set of goggles 20a and 20b includes a receiver (e.g., receiver 70a and receiver 70b) containing a battery source (not shown). Receivers 70a-70b receive the audio and video signals transmitted from processors 16a-16b.

Figure 4:
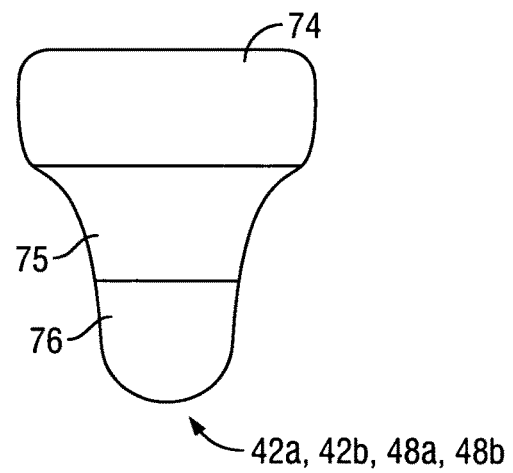
FIG. 4 is a view of a wireless earphone.

Referring to FIG. 4, each earphone 24a, 24b, 26a and 26b includes a receiver 74 for receiving audio signals from a corresponding microphone 42a, 42b, 48a and 48b an amplifier 75 for amplifying the audio signal and a transducer 76 for broadcasting audio signals.

Figure 5:
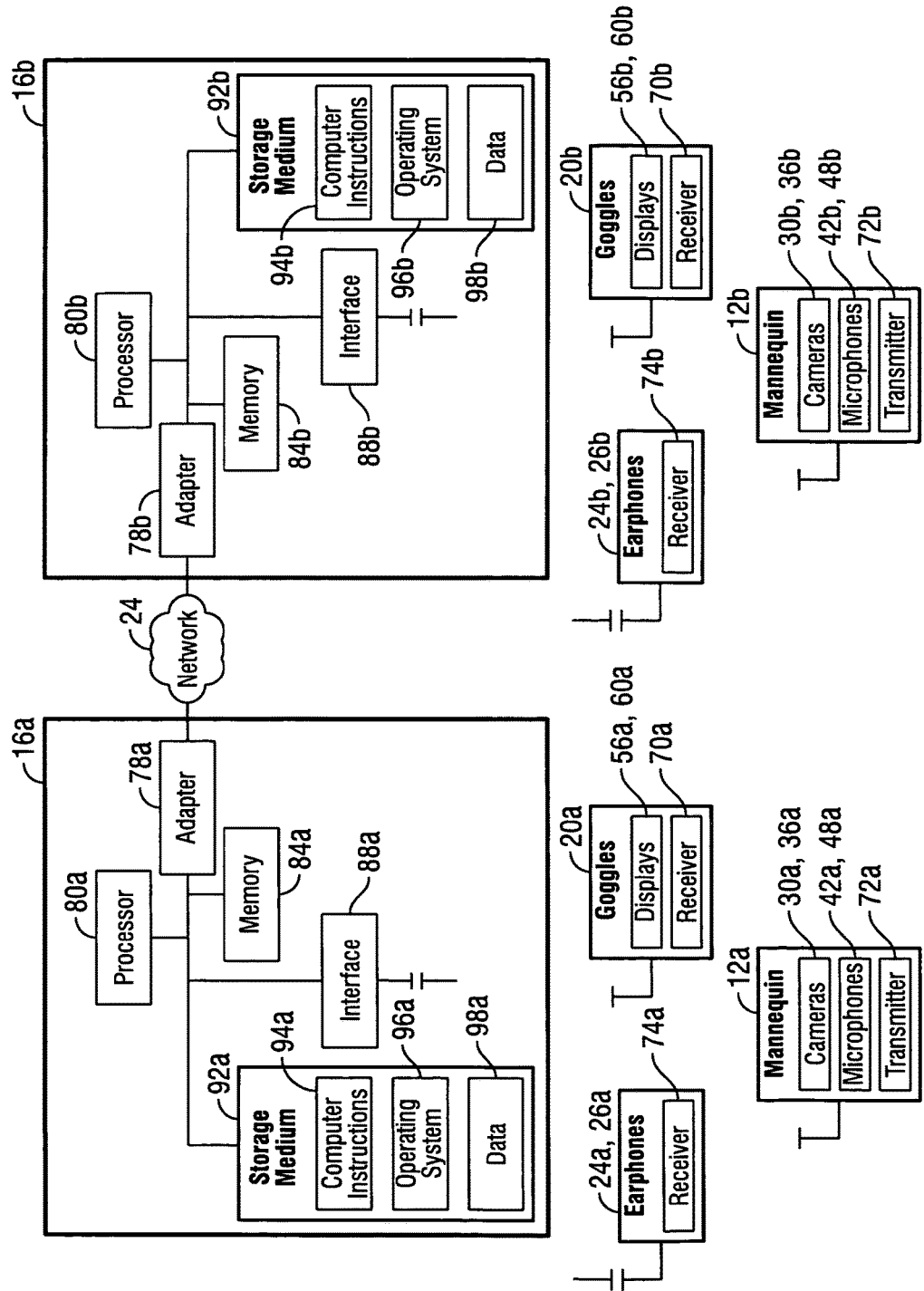
FIG. 5 is a functional diagram of the virtual encounter system.

Referring to FIG. 5, each communication gateway 16a-16b includes an adapter 78a-78b, a processor 80a-80b, memory 84a-84b, an interface 88a-88b and a storage medium 92a-92b (e.g., a hard disk). Each adapter 78a-78b establishes a bi-directional signal connection with network 24.

Each interface 88a-88b receives, via transmitter 72a-78b in mannequin 12a-12b, video signals from cameras 30a-30b, 36a-36b and audio signals from microphones 42a-42b, 48a-48b. Each interface 88a-88b sends video signals to displays 56a, 56b in goggles 20a-20b via receiver 70a-70b. Each interface 88a sends audio signals to earphones 24a-24b, 26a-26b in goggles 20a-20b via receiver 74a-74b.

Each storage medium 92a-92b stores an operating system 96a-96b, data 98a-98b for establishing communications links with other communication gateways, and computer instructions 94a-94b which are executed by processor 80a-80b in respective memories 84a-84b to coordinate, send and receive audio, visual and other sensory signals to and from network 24.

Signals within system 10 are sent using a standard streaming connection using time-stamped packets or a stream of bits over a continuous connection. Other examples, include using a direct connection such as an integrated services digital network (ISDN).

Figure 6:
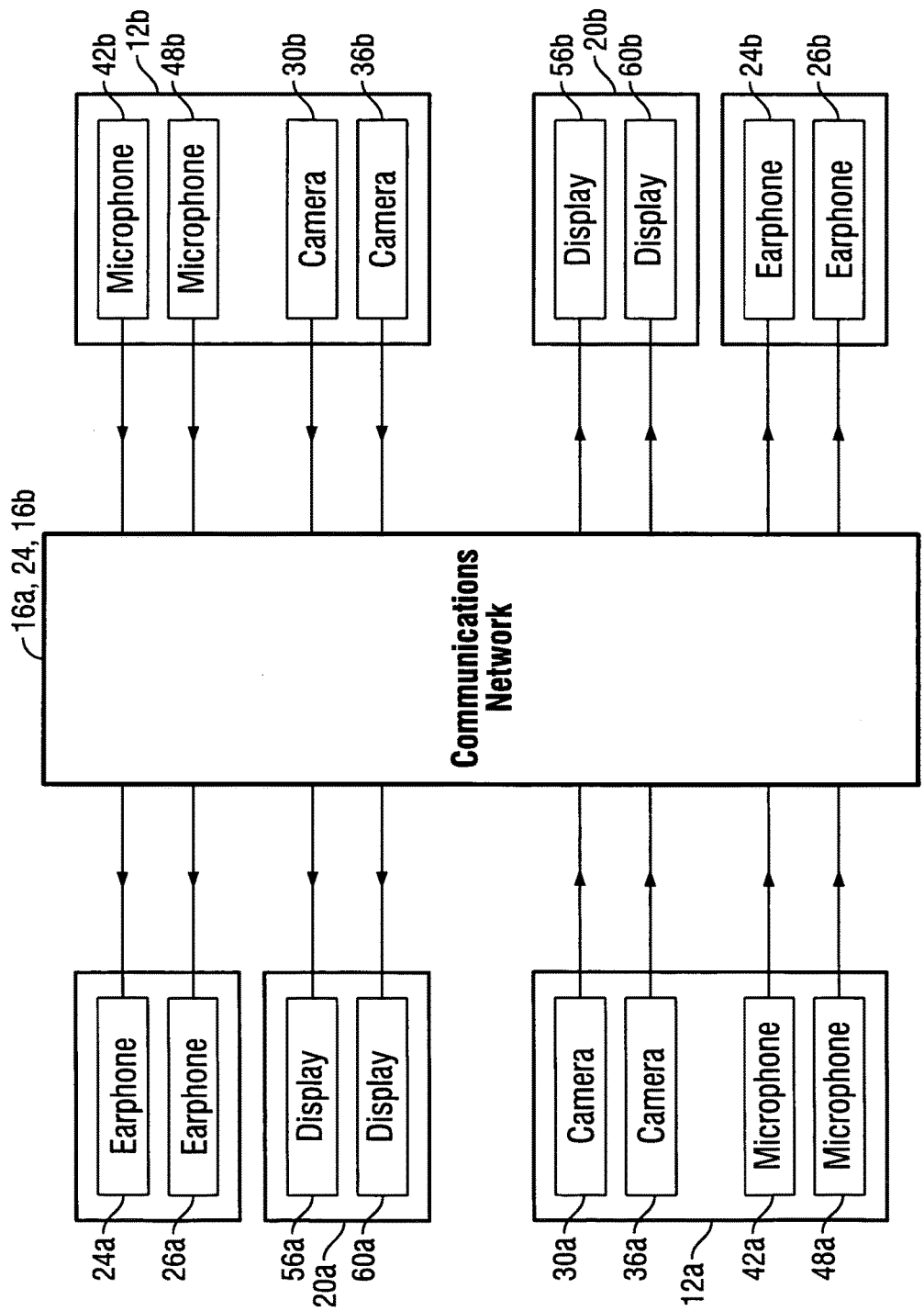
FIG. 6 is a signal flow diagram of the virtual encounter system.

Referring to FIG. 6, in operation, camera 30b and camera 36b record video images from Location B. The video images are transmitted wirelessly to communication gateway 16b as video signals. Communication gateway 16b sends the video signals through network 28 to communication gateway 16a. Communication gateway 16b transmits the video signals wirelessly to set of goggles 20a. The video images recorded by camera 30b are rendered on to display 56a, and the video images recorded on camera 36b are rendered on to display 60a.

Likewise, communication gateway 16a and communication gateway 16b work in the opposite direction through network 24, so that the video images, from location A, recorded by camera 30a are rendered on to display 56b. The video images, recorded by camera 36a are rendered on display 60b.

The sounds received by microphone 42a in location A, are transmitted to earphone 24b and sounds received in location A by microphone 52a are transmitted to earphone 26b. The sounds received by microphone 42b in location B, are transmitted to earphone 24a and sounds received in location B by microphone 52b are transmitted to earphone 26a.

Using system 10, two people can have a conversation where each of the persons perceives that the other is in the same location as them.

Referring to FIGS. 7A and 7B, the user 22a is shown wearing motion sensors 101, over portions of their bodies, and in particular over those portions of the body that exhibit movement. In addition, the mannequins are replaced by robots. For example, a robot 12b includes a series of motion actuators 103. Each motion actuator 103 placement corresponds to a motion sensor 101 on the user 22a so that each motion sensor activates a motion actuator in the robot that makes the corresponding movement.

For example, when the user 22a moves their right hand, a sensor in the right hand sends a signal through the network to a motion actuator on the robot. The robot 12b in turn moves its right hand.

In another example, a user 22a can walk towards a robot 12a in location A. All the sensors on the user 22a send a corresponding signal to the actuators on the robot 12b in location B. The robot 12b in location B performs the same walking movement. The user 22b in location B is not looking in location B but rather through the eyes of the robot 12a in location A so that user 22b does see the user 22a in location A walking towards them, but not because the robot 12b in location B is walking. However, the fact that the robot 12b in location B is walking enables two things to happen. First, since the user 22a in location A is seeing through the eyes of the robot 12b in location B and since the robot 12b in location B is walking enables the user 22a in location A to see what he would see if he were indeed walking in location B. Second, it enables the robot 12b in location B to meet up with the user 22b in location B.

Referring to FIGS. 8A and 8B, in still other embodiments, tactile sensors 104 are placed on the exterior of a robot hand 102 located in Location A. Corresponding tactile actuators 106 are sewn into an interior of a glove 104 worn by a user in location B. Using system 10, a user in location B can feel objects in Location A. For example, a user can see a vase within a room, walk over to the vase, and pick-up the vase. The tactile sensors-actuators are sensitive enough so that the user can feel the texture of the vase.

Figure 9A:
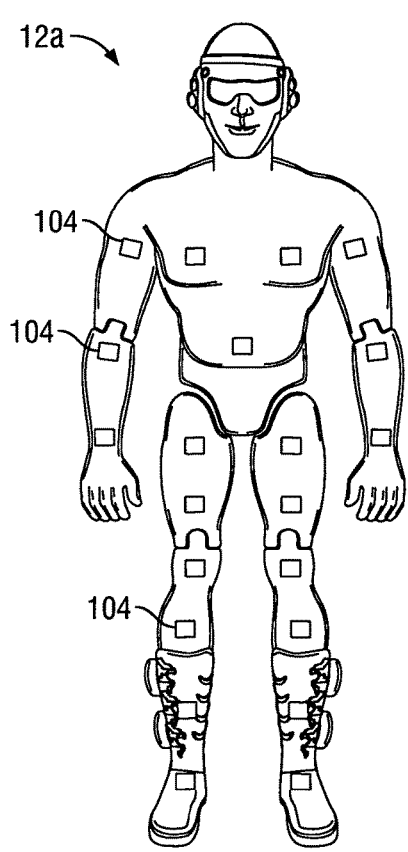
FIG. 9A is a view of a robot with tactile actuators.
Figure 9B:
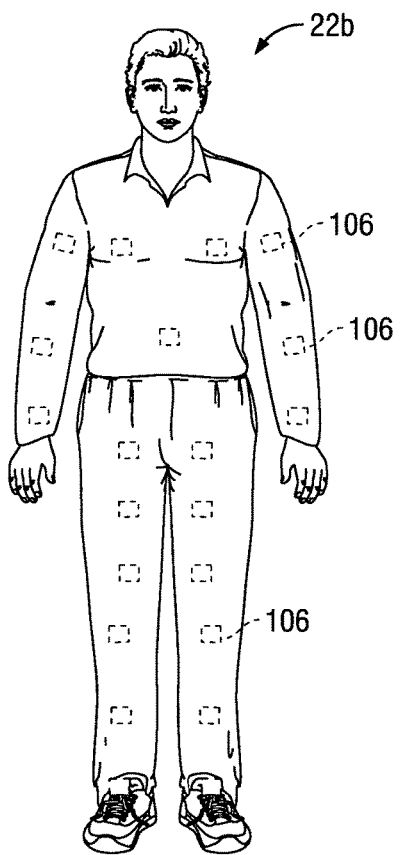
FIG. 9B is a view of the user with tactile sensors.

Referring to FIGS. 9A and 9B, in other embodiments, sensors are placed over various parts of a robot. Corresponding actuators can be sewn in the interior of a body suit that is worn by a user. The sensors and their corresponding actuators are calibrated so that more sensitive regions of a human are calibrated with a higher degree of sensitivity.

Figure 10A:
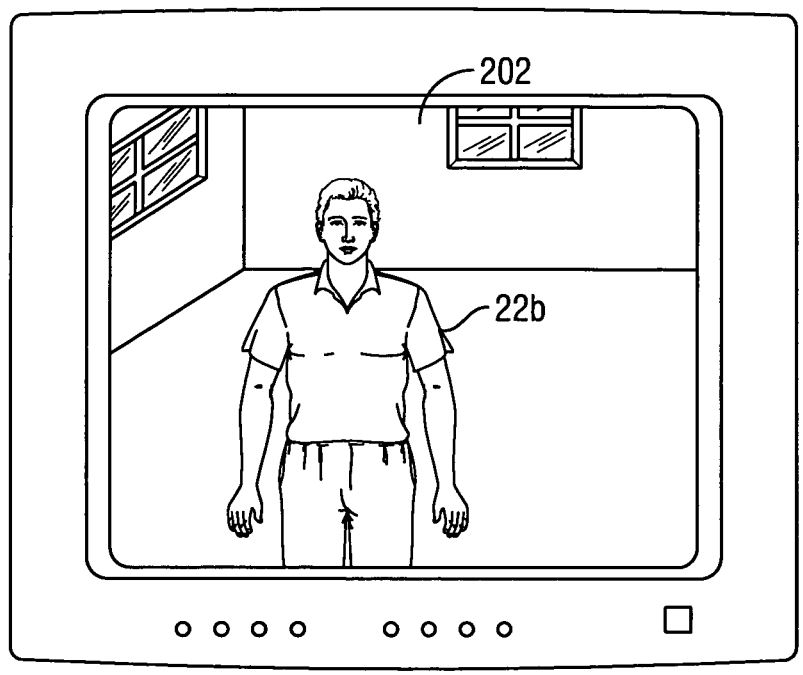
FIG. 10A is a view of a scene with the user in a room.
Figure 10B:
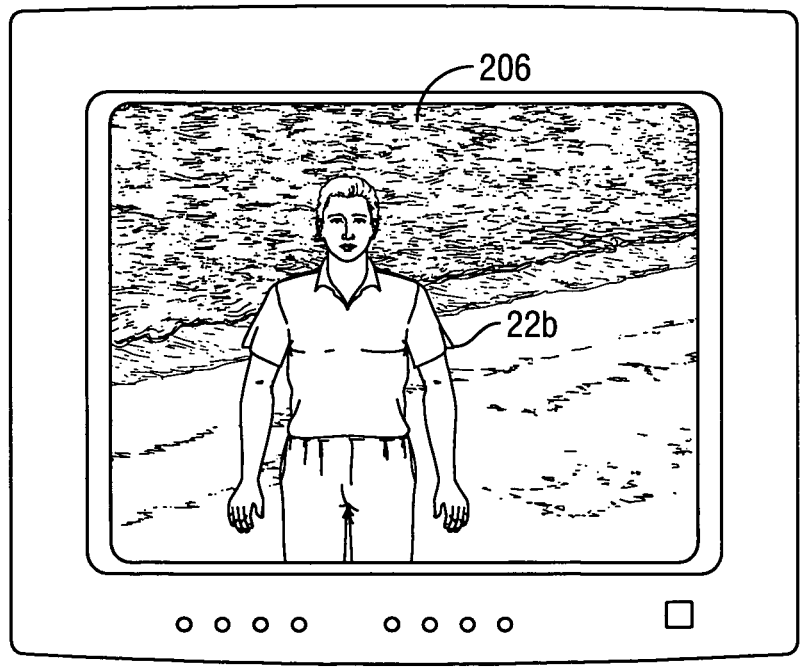
FIG. 10B is a view of the scene with the user on a beach.

Referring to FIGS. 10A and 10B in other embodiments, user 22a can receive an image of a user 22b but the actual background behind user 22b is altered. For example, user 22b is in a room 202 but user 22a perceives user 22b on a beach 206 or on a mountaintop (not shown). Using conventional video image editing techniques, the communication gateway 16a processes the signals received from Location B and removes or blanks-out the video image except for the portion that has the user 22b. For the blanked out areas on the image, the communication gateway 16a overlays a replacement background, e.g., virtual environment to have the user 22b appear to user 22a in a different environment. Generally, the system can be configured so that either user 22a or user 22b can control how the user 22b is perceived by the user 22a. Communication gateway 16a using conventional techniques can supplement the audio signals received with stored virtual sounds. For example, waves are added to a beach scene, or eagles screaming are added to a mountaintop scene.

In addition, gateway 16a can also supplement tactile sensations with stored virtual tactile sensations. For example, a user can feel the sand on her feet in the beach scene or a cold breeze on her cheeks in a mountain top scene.

In this embodiment, each storage medium 92a-92b stores data 98a-98b for generating a virtual environment including virtual visual images, virtual audio signals, and virtual tactile signals. Computer instructions 94a-94b, which are executed by processor 80a-80b out of memory 84a-84b, combine the visual, audio, and tactile signals received with the stored virtual visual, virtual audio and virtual tactile signals in data 98a-98b.

Figure 11A:
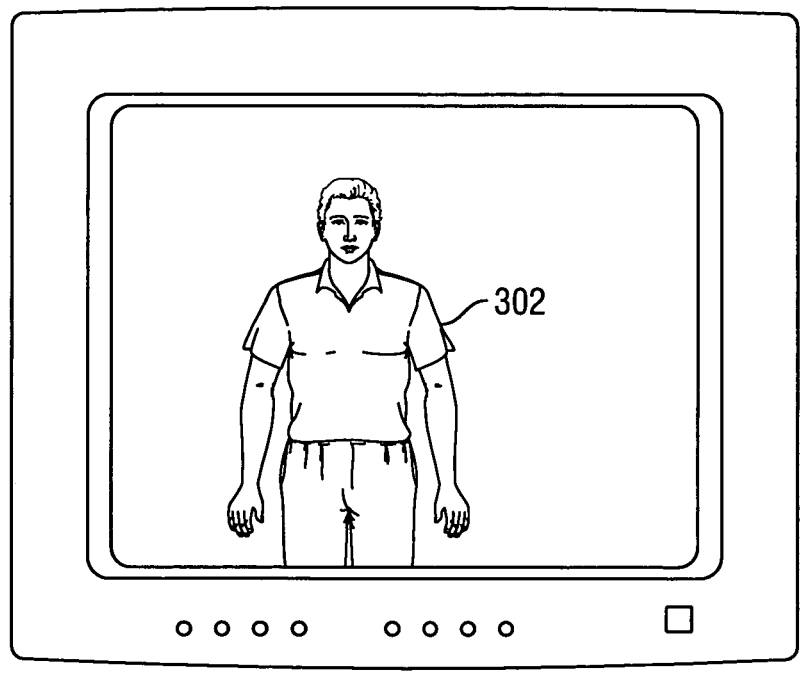
FIG. 11A is a view of an image of the user.
Figure 11B:
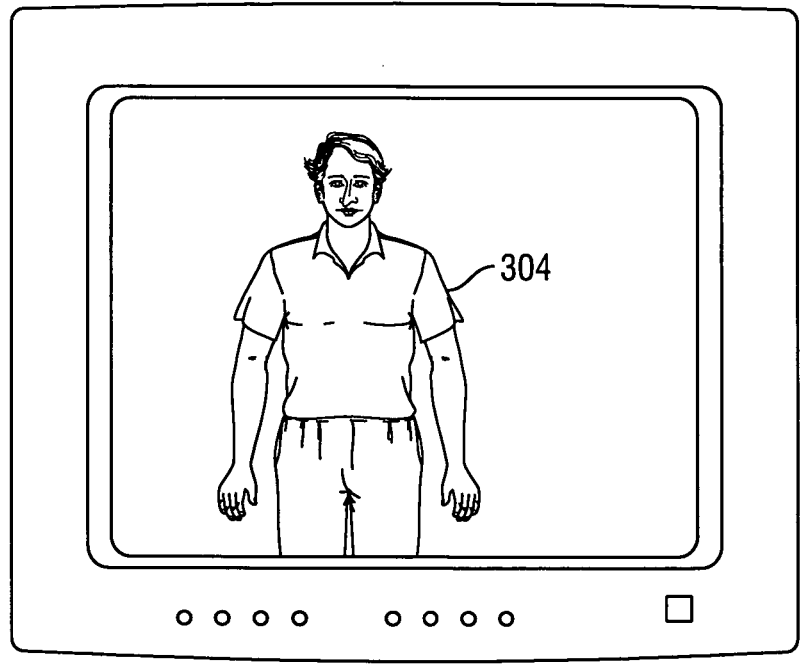
FIG. 11B is a view of a morphed image of the user.

Referring to FIGS. 11A and 11B, in other embodiments, a user 22a can receive a morphed image 304 of user 22b. For example, an image 302 of user 22b is transmitted through network 24 to communications gateway 16a. User 22b has brown hair, brown eyes and a large nose. Communications gateway 16a again using conventional imaging morphing techniques alters the image of user 22b so that user 22b has blond hair, blue eyes and a small noise and sends that image to goggles 20a to be rendered.

Communication gateway 16a also changes the sound user 22b makes as perceived by user 22a. For example, user 22b has a high-pitched squeaky voice. Communication gateway 22b using conventional techniques can alter the audio signal representing the voice of user 22b to be a low deep voice.

In addition, communication gateway 16a can alter the tactile sensation. For example, user 22b has cold, dry and scaling skin. Communications gateway 16a can alter the perception of user 22a by sending tactile signals that make the skin of user 22b seem smooth and soft.

In this embodiment, each storage medium 92a-92b stores data 98a-98b for generating a morph personality. Computer instructions 94a-94b, which are executed by processor 80a-80b out of memory 84a-84b, combine the visual, audio, and tactile signals received with the stored virtual visual, virtual audio and virtual tactile signals of a personality in data 98a-98b.

Thus using system 10 anyone can assume any other identity if it is stored in data 98a-98b.

In other embodiments, earphones are connected to the goggles. The goggles and the earphones are hooked by a cable to a port (not shown) on the communication gateway.

Other embodiments not described herein are also within the scope of the following claims.

What is claimed is:

1. A virtual reality encounter system comprising,
a first humanoid robot disposed at a first location, the first robot having tactile sensors positioned along the exterior of the robot, the sensors sending tactile signals over a communications network, the first robot including:
a first body;
a first camera coupled to the first body, the first camera for sending first video signals to the communications network; and
a first microphone coupled to the first body, the first microphone for sending first audio signals to the communications network; and
a body suit having tactile actuators, the actuators receiving the tactile signals from the corresponding tactile sensors on the robot from the communications network, with the tactile sensors and the corresponding tactile actuators calibrated in connection with variable sensitivity associated with different regions of a human; and
a gateway device, comprising:
a memory;
a computer storage medium storing data for generating supplemental virtual tactile sensation signals; and
a processor configured to execute computer instructions stored in the memory, the computer instructions configured to:
retrieve data from the computer storage medium; and
generate the supplemental virtual tactile sensation signals from the data retrieved from the computer storage medium;
overlay the tactile signals from the corresponding tactile sensors with the generated supplemental tactile sensation signals;
send the overlaid tactile signals to the body suit;
a first set of goggles at a second, different location from the first location including a display to render the first video signals received from the first camera and a transducer to transduce the first audio signals received from the first microphone;
a second humanoid robot having life-like features, the second humanoid robot at the second location, the second robot comprising:
a second body;
a second camera coupled to the second body, the second camera for sending second video signals to the communications network; and
a second microphone coupled to the second body, the second microphone for sending second audio signals to the communications network; and
a second set of goggles in the first location to receive the second video signals from the second camera and a second transducer in the first location to receive the second audio signals from the second microphone.

2. The system of claim 1, further comprising:
motion sensors positioned throughout the body suit, the motion sensors sending motion signals corresponding to movements of each sensor relative to a reference point, the motion signals transmitted to the communications network; and
the humanoid robot, receiving, from the communications network the signals from the motion sensors, the signals from the motion sensors causing a movement of the robot that is correlated to a movement of the body suit.

3. The system of claim 2, wherein the robot includes actuators corresponding to the motion sensors, the actuators causing the robot to move.

4. The system of claim 1, wherein the gateway device is a first gateway device in the first location; and the system further comprises:
a second gateway device having a processor, the second gateway device in the second location and the second gateway device connected to the first gateway device via the network.

5. The system of claim 1, wherein the gateway device comprises an interface having one or more channels configured to:
receive the audio signals from the second microphone;
receive the video signals from the second camera;
send the first video signals to the first set of goggles; and
send the first audio signals to the transducer.

6. The system of claim 1, wherein the first body includes an eye socket and the first camera is positioned in the eye socket.

7. The system of claim 1, wherein the first body includes an ear canal and the first microphone is positioned within the ear canal.

8. The system of claim 7, wherein the first and second sets of goggles, comprise a receiver to receive the video signals.

9. The system of claim 1, wherein the first and the second robots each comprise a transmitter to wirelessly send corresponding ones of the first and second audio signals, tactile signals, motion signals and the video signals to the communications network.

10. A method of having a virtual encounter, comprising:
sending tactile signals over a communications network from tactile sensors coupled to a first humanoid robot, the tactile sensors positioned along the exterior of the first humanoid robot;
sending motion signals from motion sensors positioned along the surface of a human, the motion signals corresponding to movements of each sensor relative to a reference point, the motion signals being transmitted to the communications network;
receiving, at the first humanoid robot, the motion signals sent by the motion sensors;
causing a movement of the first humanoid robot that is correlated to a movement of the human based on the motion signals received from the motion sensors;
sending first audio signals over the communications network, the first audio signals being produced from a first microphone coupled to the first humanoid robot;
sending first video signals to the communications network, the first video signals being produced from a first camera coupled to the first humanoid robot;
sending second audio signals to the communications network from a second microphone coupled to a second robot having life-like features;

sending second video signals to the communications network from a second camera coupled to the second robot;
rendering the second set of video signals received from the communications network using a display device embedded in a first set of goggles; and
transducing the second set of audio signals received from the communications network using a transducer embedded in the first set of goggles;
rendering the first video signals received from the communications network using a display device embedded in a second, different set of goggles;
transducing the first audio signals received from the communications network using a transducer embedded in the second set of goggles;
receiving the tactile signals from the communications network at a body suit having corresponding tactile actuators, with the tactile sensors and the corresponding tactile actuators calibrated in connection with variable sensitivity associated with different regions of a human;
generating by a gateway device having a computer storage medium supplemental virtual tactile sensation signals based on data stored in the computer storage medium;
overlaying, by the gateway device, the tactile signals from the corresponding tactile sensors with the generated supplemental tactile sensation signals; and
sending the overlaid tactile signals to the body suit.

11. The method of claim 10, wherein receiving comprises receiving motion signals from the motion sensors at corresponding motion actuators coupled to the first humanoid robot, causing a movement comprises the motion actuators causing the first humanoid robot to move.

12. The method of claim 10, wherein the first humanoid robot includes an eye socket and the camera is positioned in the eye socket.

13. The method of claim 10, wherein the first humanoid robot includes an ear canal and further comprising positioning the first microphone within the ear canal.

14. The method of claim 10, wherein each of the first and second sets of goggles, comprise a receiver to receive corresponding ones of the first and second video signals.

15. The method of claim 10, wherein first humanoid the robot further comprises a transmitter to wirelessly send the first audio signals, the first motion signals, the first tactile signals and the first video signals to the communications network.

* * * * *